United States Patent
Yano

(10) Patent No.: US 8,130,414 B2
(45) Date of Patent: Mar. 6, 2012

(54) IMAGE FORMING APPARATUS USING A DENSITY PATTERN

(75) Inventor: Yuzuru Yano, Toride (JP)

(73) Assignee: Canon Kabushiki Kaisha (JP)

( * ) Notice: Subject to any disclaimer, the term of this patent is extended or adjusted under 35 U.S.C. 154(b) by 660 days.

(21) Appl. No.: 12/170,241

(22) Filed: Jul. 9, 2008

(65) Prior Publication Data

US 2009/0015853 A1 Jan. 15, 2009

(30) Foreign Application Priority Data

Jul. 10, 2007 (JP) ................................. 2007-181442

(51) Int. Cl.
- *H04N 1/407* (2006.01)
- *H04N 1/29* (2006.01)
- *G06K 15/14* (2006.01)

(52) U.S. Cl. ........ 358/1.9; 358/3.21; 358/406; 358/300; 347/135

(58) Field of Classification Search .................... 358/1.9, 358/1.7, 3.01, 3.21, 501, 504, 521, 401, 406, 358/461, 300; 399/15, 49, 72, 74; 347/131, 347/133, 135

See application file for complete search history.

(56) References Cited

U.S. PATENT DOCUMENTS

| | | | | |
|---|---|---|---|---|
| 5,754,683 A | * | 5/1998 | Hayashi et al. | 358/521 |
| 6,223,007 B1 | * | 4/2001 | Kitagawa et al. | 399/49 |
| 6,226,466 B1 | * | 5/2001 | Ojima et al. | 399/49 |
| 7,130,076 B2 | * | 10/2006 | Shibuya et al. | 358/1.9 |
| 7,180,625 B2 | * | 2/2007 | Nakamura | 358/504 |
| 7,236,276 B2 | * | 6/2007 | Nakane et al. | 358/521 |
| 7,983,578 B2 | * | 7/2011 | Yoshida et al. | 399/49 |
| 2006/0044616 A1 | | 3/2006 | Satoh et al. | |

FOREIGN PATENT DOCUMENTS

| | | |
|---|---|---|
| JP | 2000-350025 A | 12/2000 |
| JP | 2006074305 A | 3/2006 |

OTHER PUBLICATIONS

Office Action issued Sep. 30, 2011 for corresponding Japanese Patent Application No. 2007-181442.

* cited by examiner

*Primary Examiner* — Scott A Rogers
(74) *Attorney, Agent, or Firm* — Rossi, Kimms & McDowell LLP

(57) ABSTRACT

An image forming apparatus for forming a tone image using a density pattern method has a ROM for storing a density pattern corresponding to each of a number of tones and an ideal density value of each density pattern, and a sensor for detecting the optical density of an image that has been formed by an image forming unit that forms the image by an electrophotographic method. An image is formed by the image forming unit based upon the density pattern corresponding to each tone, and the density pattern corresponding to each tone is modified based upon optical density, which has been obtained by detecting the density of the image by the sensor, and the ideal density value of each density pattern.

7 Claims, 11 Drawing Sheets

| M\N | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 15 | 14 | 12 | 10 | 8 | 6 | 4 | 2 | 1 | 3 | 5 | 7 | 9 | 11 | 13 | 15 |

F I G. 4
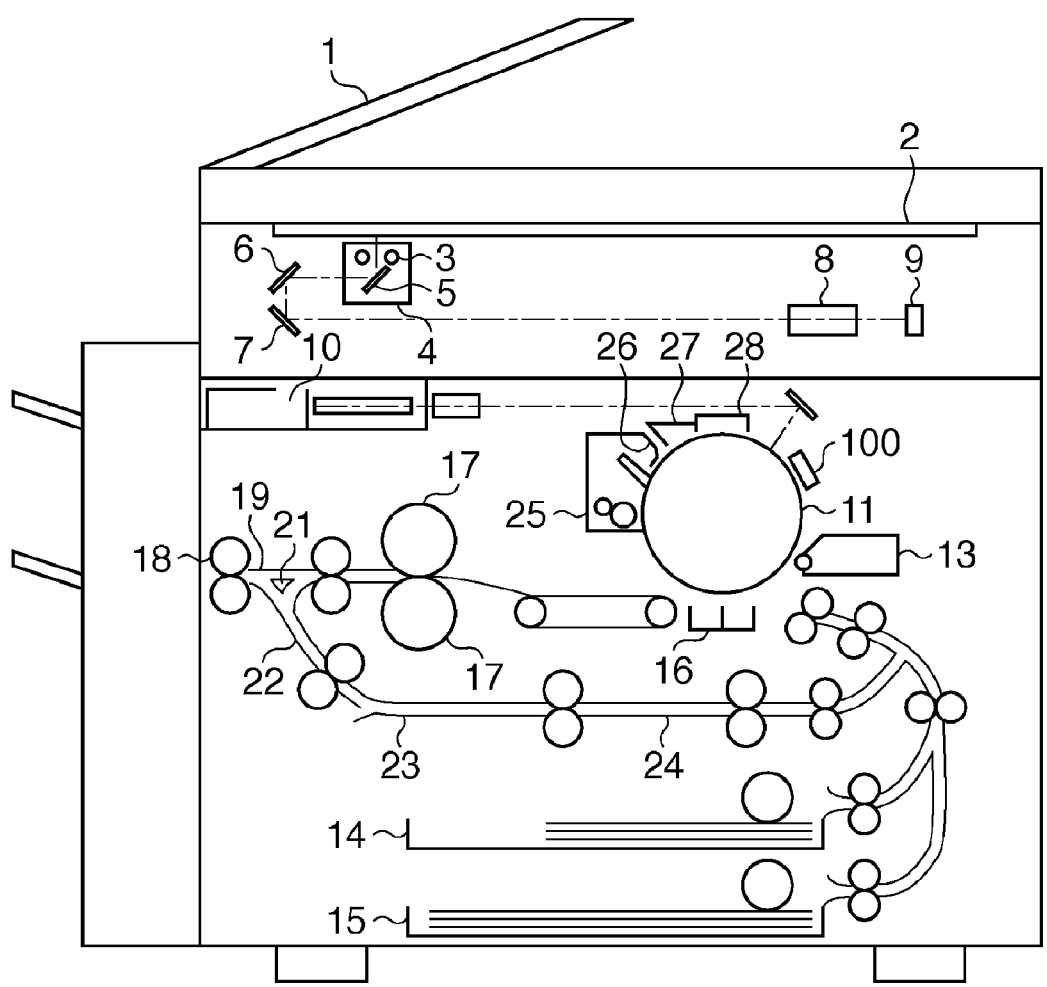

F I G. 5
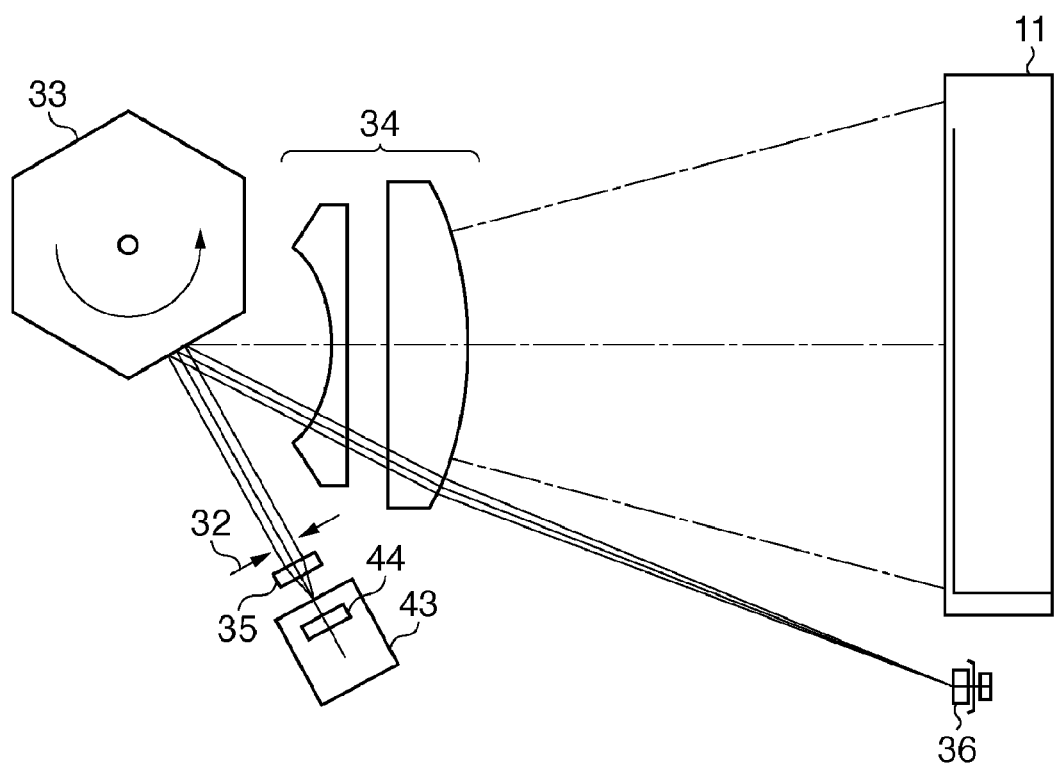

| PWM PATTERN | DENSITY |
|---|---|
| 0 | 0.06 |
| 1 | 0.06 |
| 2 | 0.06 |
| 3 | 0.079 |
| 4 | 0.2 |
| 5 | 0.396 |
| 6 | 0.632 |
| 7 | 0.821 |
| 8 | 1.029 |
| 9 | 1.175 |
| 10 | 1.262 |
| 11 | 1.311 |
| 12 | 1.365 |
| 13 | 1.379 |
| 14 | 1.383 |
| 15 | 1.411 |

| PWM PATTERN | DENSITY |
|---|---|
| 0 | 0.074 |
| 1 | 0.169 |
| 2 | 0.256 |
| 3 | 0.348 |
| 4 | 0.405 |
| 5 | 0.491 |
| 6 | 0.592 |
| 7 | 0.668 |
| 8 | 0.719 |
| 9 | 0.801 |
| 10 | 0.954 |
| 11 | 1.091 |
| 12 | 1.140 |
| 13 | 1.231 |
| 14 | 1.295 |
| 15 | 1.364 |

F I G. 10A
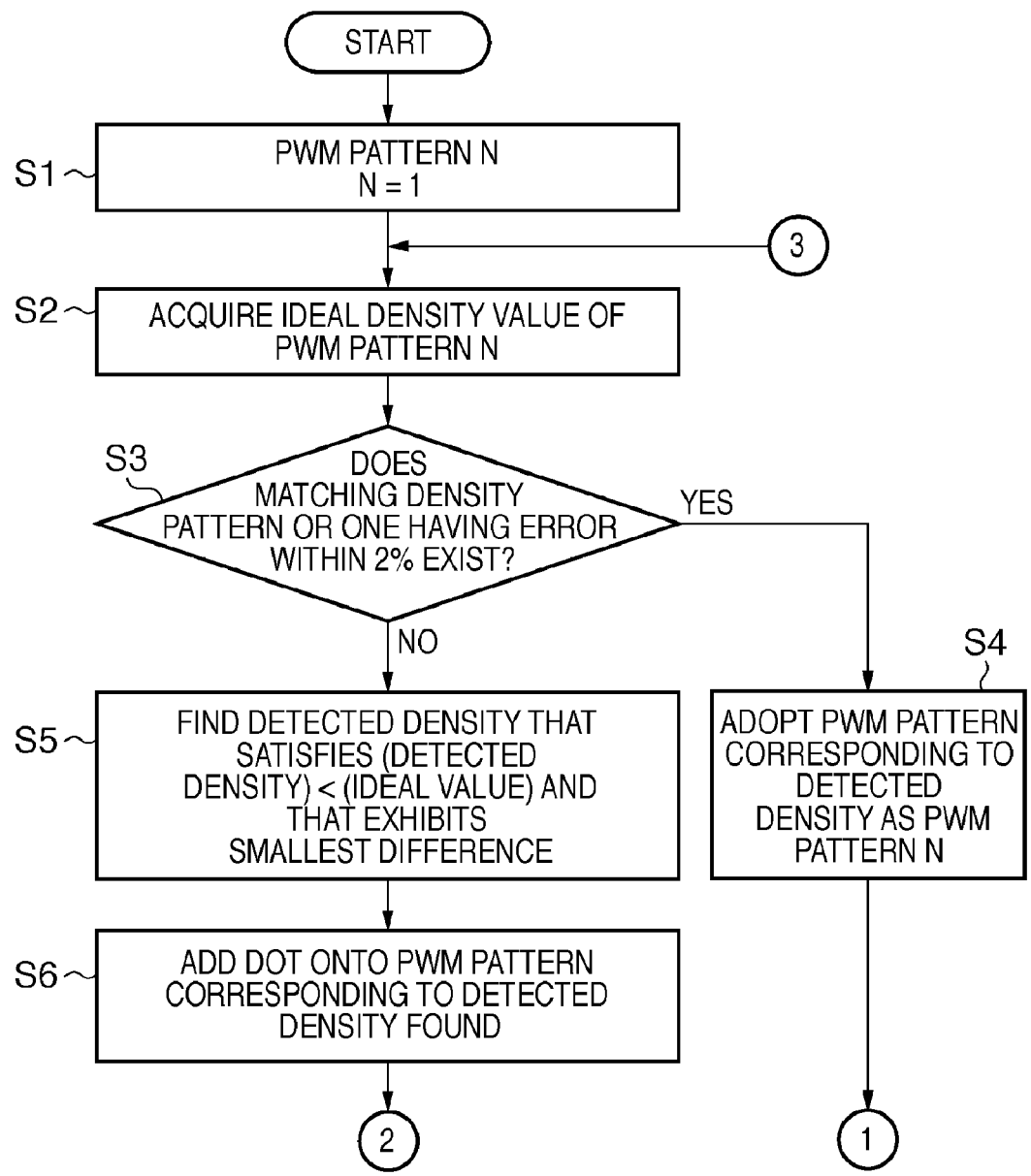

IMAGE FORMING APPARATUS USING A DENSITY PATTERN

BACKGROUND OF THE INVENTION

1. Field of the Invention

The present invention relates to an image forming apparatus for forming an image by an electrophotographic method.

2. Description of the Related Art

When multi-level image data is printed as by a digital copier or laser printer utilizing electrophotography, use is made of tone representation that relies upon a density pattern method.

FIG. 1 illustrates the smallest unit (pixel) for representing density by the density pattern method that expresses tone of one pixel in accordance with number of filled-in dots within an N×M dot pattern. In a case where N or M is 1, the result is a one-dimensional block. If N and M are 2 or greater, then the result is a two-dimensional block. Take a two-dimensional block as an example. With a binary printer having a resolution of 600 dpi, a total of 17 (16+1) tones can be expressed by adopting 4×4 dots as the smallest unit (block) and changing the number of black dots inside the block in accordance with the density of the pixel.

FIG. 2 is a diagram illustrating a typical one-dimensional block [1×N dots (N=16)]. It should be noted that the numerals in FIG. 2 indicate the order in which black dots are assigned in accordance with tone by the density pattern method. For example, the ninth dot is only formed when density of image data is "1", and the ninth dot and the eighth dot are formed when density of image data is "2", and the like (see FIG. 6).

FIG. 3 is a diagram illustrating the configuration of an image forming system according to the prior art.

As shown in FIG. 3, a printer 401 is internally provided with a controller 410, an image processor 420 and an exposure unit 430. If, upon receiving image data (inclusive of a photographic image or character image, etc.) from a host computer 400, the image data represents a character image, then the controller 410 converts the image data to a prescribed bitmap signal (e.g., white is made "00h" and black is made "1Fh"), where h represents a hexadecimal number. If the image data represents a photographic image, on the other hand, then the controller converts the image data to code signal (from white "00h" to "1Fh" (black)) the numerical value of which increases as density increases, and sends the code to the image processor 420. The image processor 420 subjects this image data to various image processing and sends the resultant signal to the exposure unit 430. The exposure unit 430 modulates a laser beam in accordance with the output signal from the image processor 420, exposes a photosensitive member and prints the image through the processes of development, transfer and fixing.

It has been pointed out that with the density pattern method, tone reproduction of halftones utilizing the ability of a printer fully cannot be achieved for the following reasons:

(1) the graphed points in the density characteristic of the photosensitive member of the exposure unit 430 are not evenly spaced (linear) with respect to the image data;

(2) the graphed points in the development characteristic are not evenly spaced (linear) with respect to the image data; and (3) the graphed points in the transfer characteristic are not evenly spaced (linear) with respect to the image data.

Further, in each of the steps relating to image formation, the correlation between the image data and the tone of the image formed is extremely complex, and there are instances where the tonality of the image finally obtained through each step differs from the tonality of the input image data.

More specifically, the tonality of the image formed varies depending upon the type of photosensitive member (material and film thickness, etc.); the development scheme (one-component or two-component, contact or contactless); the bias applied in charging, developing and transfer; the amount of developer electrically charged; and the type of transfer member, etc. In addition, the tone characteristic may vary greatly depending upon the state of the apparatus when used initially and after use over a long period of time, or depending upon use in environments of different temperature and humidity.

In order to solve this problem, Japanese Patent Application Laid-Open No. 2000-350025 describes that excellent tone reproduction of halftones is performed by creating density patterns greater than a number of density patterns determined by a prescribed number of dots and changing over the density patterns to be used. Further, there are also cases where filled-dot patterns among these density patterns are discretely configured and then tone reproduction of halftones is carried out using the discretely configured patterns. The fact that an image forming apparatus using the electrophotographic method has the characteristics set forth below can be mentioned as a reason for this.

(1) In a case where adjacent dots have been formed, if the laser spot diameter becomes too large, then a portion in which the dots overlap is produced.

(2) The characteristic (relationship between exposure energy and drum surface potential) of amount of exposure vs. electric potential of a photosensitive drum is not linear.

(3) The development characteristic (reflective density vs. development contrast) is not linear.

Owing to these characterizing features, the relationship between the density of input data and optical density of the output image loses its linearity in dependence upon the contiguity of filled-in dots. Consequently, the relationship between halftone data and the tone of an output image varies owing to a difference in the order (image signal density pattern) in which dots are filled in (made black) in accordance with a tone of the kind mentioned above. Conceivable as a method of dealing with this is to provide a plurality of types of density patterns for reproducing halftones and change over the density pattern used in conformity with the image formation characteristic of the apparatus.

In a case where a plurality of types of density patterns for reproducing halftones are provided, the number of density patterns that must be set in advance becomes enormous when individual differences among apparatuses and changes in environment are taken into account. As a consequence, the storage capacity for storing the density patterns increases and this invites higher cost. Further, the processing for detecting the density of a formed image and selecting the optimum density pattern from among such an enormous quantity of density patterns based on the detected density is complicated and difficult to implement.

SUMMARY OF THE INVENTION

An aspect of the present invention is to solve the above-mentioned problems of the prior art.

In accordance with another aspect of the present invention, the reproducibility of halftones of an input image can be improved by making the density of a formed density pattern approach an ideal density value.

According to an aspect of the present invention, there is provided an image forming apparatus for forming a tone image using a density pattern method, comprising:

an image forming unit configured to form an image by en electrophotographic method;

a first storage unit configured to store a density pattern corresponding to each tone and an ideal density value of the density pattern in correspondence with each other;

a density detection unit configured to detect an optical density of an image that has been formed by the image forming unit; and a modification unit configured to cause the image forming unit to form an image based on a density pattern corresponding to each tone and modify the density pattern corresponding to the each tone, which has been stored in the first storage unit, based upon the optical density detected by the density detection unit and the ideal density value corresponding to the density pattern.

According to another aspect of the present invention, there is provided an image forming apparatus for forming a tone image using a density pattern method, comprising:

an image forming unit configured to form an image by en electrophotographic method;

a first storage unit configured to store a density pattern corresponding to each tone and an ideal density value corresponding to the each tone;

a density detection unit configured to detect an optical density of an image that has been formed by the image forming unit;

a control unit configured to cause the image forming unit to form the density pattern corresponding to the each tone, stored in the first storage unit, and stores an optical density of the density pattern corresponding to the each tone in a second storage unit, detected by the density detection unit;

a replace unit configured to replace a first density pattern corresponding to a first tone, which has been stored in the first storage unit, with a density pattern corresponding to a first optical density stored in the second storage unit, in a case that a first ideal density value corresponding to the first tone stored in the first storage unit and the first optical density stored in the second storage unit match or differ by less than a prescribed amount; and a modification unit configured to modify a first density pattern corresponding to a first tone, which has been stored in the first storage unit, using a density pattern corresponding to a first optical density being less than a first ideal density value and closest to the first ideal density value stored in the second storage unit, in a case that the first ideal density value corresponding to the first tone stored in the first storage unit and any one of optical densities stored in the second storage unit differ by the prescribed amount or more than.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 depicts a sectional view illustrating the overall configuration of an image forming apparatus (copier) according to an exemplary embodiment of the present invention;

FIG. 5 is a diagram useful in describing the structure of an exposure controller in a copier according to this embodiment;

FIGS. 10A and 10B are flowcharts describing processing for updating a PWM pattern in the image forming apparatus according to this embodiment.

DESCRIPTION OF THE EMBODIMENTS

Figures 1, 2:
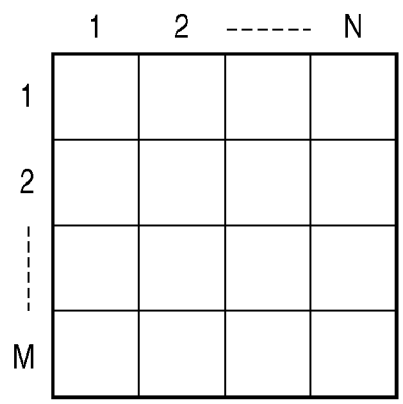
FIG. 1 is a diagram illustrating the smallest unit of tone representation composed of M×N dots used by the density pattern method.
FIG. 2 is a diagram illustrating a typical one-dimensional block (1×16) used in the density pattern method.
Figure 3:
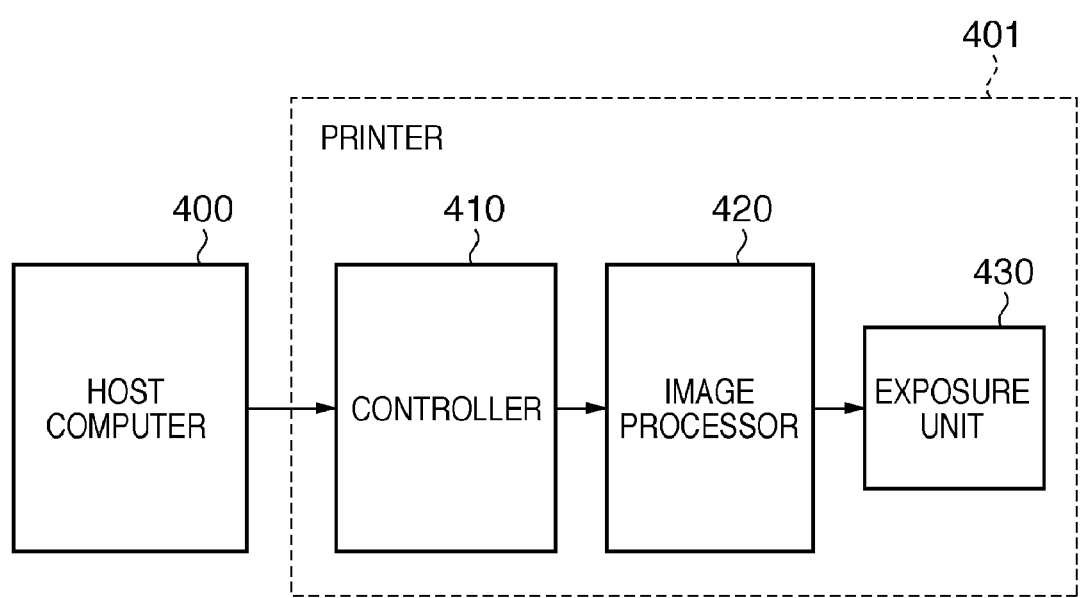
FIG. 3 is a diagram illustrating the configuration of an image forming system according to the prior art.

Numerous embodiments of the present invention will now be described in detail with reference to the accompanying drawings. The following embodiments are not intended to limit the claims of the present invention.

FIG. 4 depicts a sectional view illustrating the overall configuration of an image forming apparatus (copier) according to an exemplary embodiment of the present invention.

Documents that have been stacked on an automatic document feeder (ADF) 1 are transported to and placed on a platen glass 2 one sheet after another, whereupon a lamp in a scanner 3 is lit and a scanner unit 4 moved to thereby illuminate the document. Light reflected from the document passes through a lens 8 upon being reflected by mirrors 5, 6, 7 and subsequently is input to an image sensor 9. As a result, the image sensor 9 generates an image signal conforming to the input image and outputs the image signal directly or stores in an image memory (not shown) temporarily. After the image signal is read out of the image memory, it is input to an exposure controller 10. An electrostatic latent image corresponding to this image signal is formed on a photosensitive member 11 by a laser beam generated by the exposure controller 10 in accordance with the image signal. A potential sensor 100 senses the potential on the photosensitive member 11. The electrostatic latent image is developed by toner supplied from a developing unit 13.

A transfer member (sheet) is transported from a paper cassette 14 or 15 in conformity with the timing at which the latent image is formed on the photosensitive member 11. The toner image developed on the photosensitive member 11 is transferred to the sheet by a transfer unit 16. The sheet to which the toner image has thus been transferred is fed to a fixing unit 17, where the toner image is fixed to the sheet. The sheet is then discharged to the exterior of the apparatus from a discharge unit 18.

The surface of the photosensitive member 11 after the transfer of the toner image to the sheet is wiped clean by a cleaner 25, and electric charge is removed from the cleaned surface of the photosensitive member 11 by an auxiliary charger 26. In this way, the photosensitive member 11 is ready to be charged by a primary charger 28, then residual charge on the photosensitive member 11 is removed by a pre-exposure lamp 27. The surface of the photosensitive member 11 is then charged by the primary charger 28. This process is repeated to thereby form a tone image.

If double-sided printing has been specified, the transport path of the sheet after fixing of the image is changed over by a flapper 21 and the sheet is sent to transport paths 22, 23, 24 for double-sided printing. The transfer unit 16 performs image transfer to the reverse side of the sheet that has traversed the path 24 and on the obverse side of which an image has already been formed. A discharge sensor 19 senses the fact that the sheet following image fixation has been discharged.

Processing for reading a document on the platen glass by a scanner and then copying the document has been described above as an example. In a case where image data from an external unit (such as a host computer (PC)) is input and printed, the image data is input from the external unit to the image forming apparatus via an interface (not shown) and the image data is stored in an image memory. Processing form this point onward is similar to the copy processing described above.

FIG. 5 is a diagram useful in describing the structure of the exposure controller 10 in the copier according to this embodiment.

As shown in FIG. 5, a PD sensor 44 for sensing some of the laser light is provided within a semiconductor laser 43. Automatic power control of the semiconductor laser 43 is carried out using the signal sensed by the PD sensor 44. The laser light emitted from the semiconductor laser 43 is made substantially parallel light by a collimator lens 35 and iris 32 and impinges with a prescribed beam diameter upon a polygonal mirror 33. The polygonal mirror 33 rotates at a uniform angular speed in the direction indicated by the arrow. Owing to such rotation, the incident laser beam is reflected in the form of a deflected beam of a continuously changing angle. The light of the reflected beam is condensed by an f-θ lens 34.

The f-θ lens 34 performs a correction of distortion and aberration for assuring the temporal linearity of scanning. The light beam is scanned across the photosensitive member 11, which serves as an image carrier, at a uniform speed in the direction of the arrow in FIG. 5. It should be noted that a BD sensor 36 is a beam detecting (BD) sensor for detecting light reflected from the polygonal mirror 33. The detection signal that is output from the BD sensor 36 is used as a synchronizing signal for synchronizing rotation of the polygonal mirror 33 and writing of data.

Image data is input to the exposure controller 10 from the image memory. The image data is such that one pixel is composed of four bits and is represented by density data comprising 16 tones. The exposure controller 10 uses the density pattern shown in FIG. 2 in order to represent these 16 tones. That is, one block is composed of 16 dots as the minimum drive unit of the laser in the main-scan direction and one line in the sub-scan direction. The 16-tone density data is expressed by tones in accordance with the 1×16 exposure times (number of dots and dot positions) of the laser.

Figure 6:
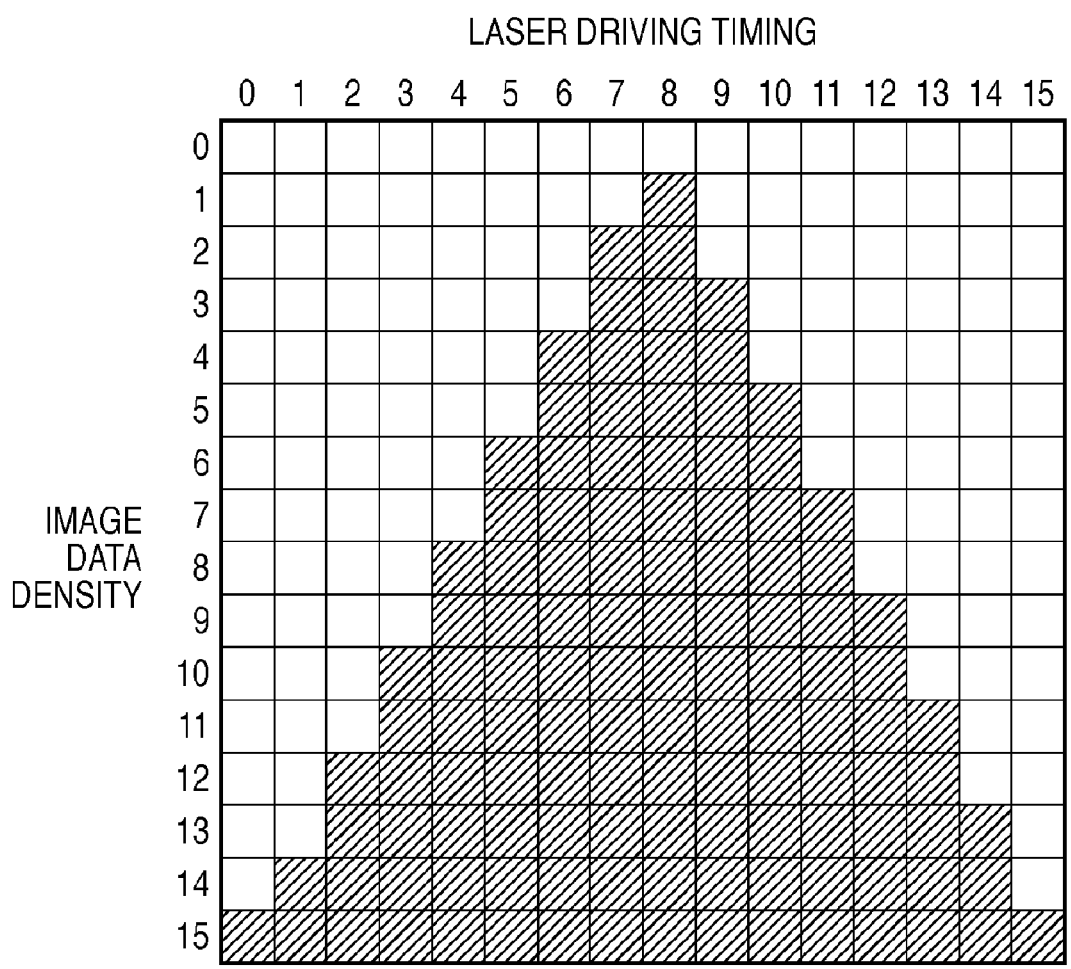
FIG. 6 is a diagram illustrating PWM patterns, which have been set in correspondence with FIG. 2, with respect to respective ones of items of 4-bit density data.

FIG. 6 is a diagram illustrating PWM patterns, which have been set in correspondence with FIG. 2, with respect to respective ones of items of 4-bit density data. In FIG. 6, an abscissa axis indicates a dot position in the patterns and a vertical axis indicates a density of image data.

The shaded portions in FIG. 6 indicate the intervals in which the laser is turned on (the time periods in which black dots exist), and the white intervals indicate the respective intervals in which the laser is turned off.

Figure 7:
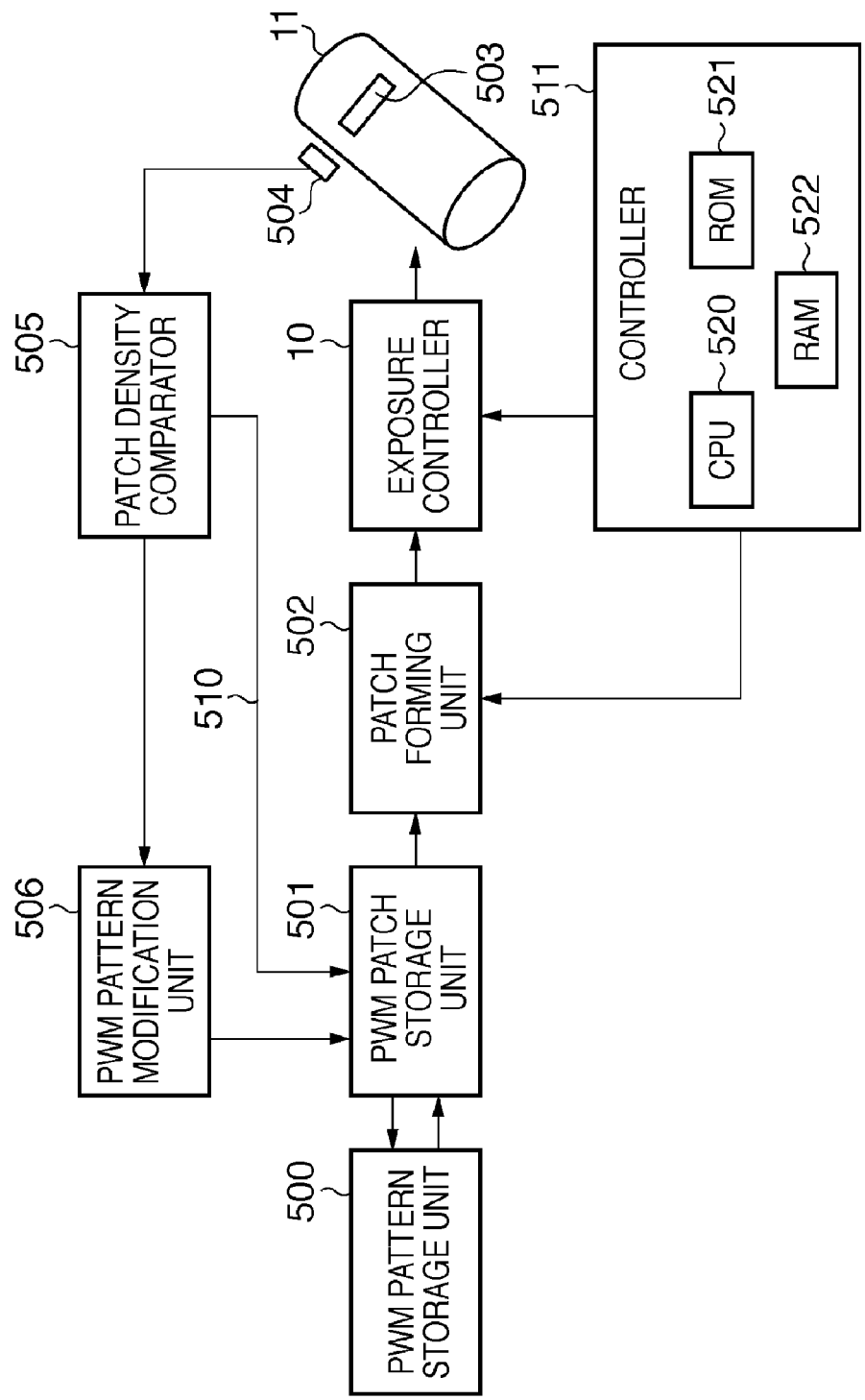
FIG. 7 is a block diagram describing a function that modifies a density pattern, this function being a feature of the image forming apparatus according to this embodiment.

FIG. 7 is a block diagram describing a function that modifies a density pattern. This function is a feature of the image forming apparatus according to this embodiment.

Figures 9A, 9B:
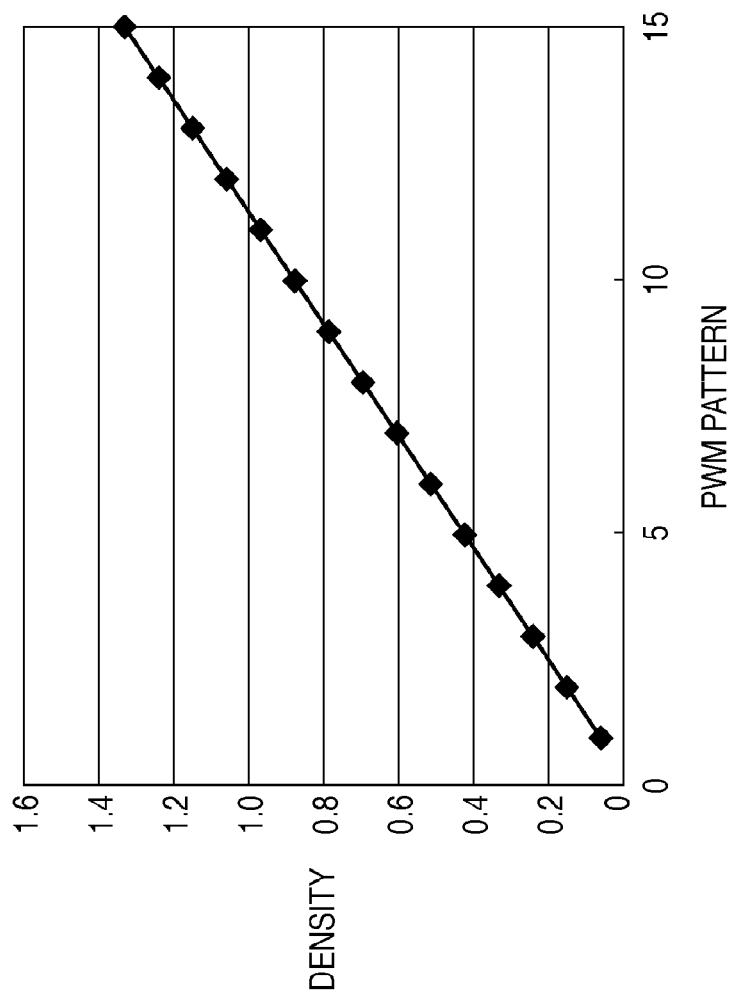
FIGS. 9A and 9B are diagrams illustrating an ideal relationship between optical densities detected by a reflective optical sensor and densities of actual PWM patterns.

A PWM pattern storage unit 500 stores PWM patterns, which are used in ordinary image processing of a tone image, is association with the tones. It is assumed that when electric power is introduced, PWM patterns of the kind shown for example in FIG. 6 have been set with respect to density data of 16 tones. A PWM patch storage unit 501 stores a PWM pattern for forming a patch. A patch forming unit 502 generates patch data for density detection in accordance with the PWM pattern supplied from the PWM patch storage unit 501 and supplies the patch data to the exposure controller 10. The exposure controller 10 forms a patch 503 on the photosensitive member 11 in accordance with the patch data (PWM pattern) supplied from the patch forming unit 502. A reflective optical sensor (density measurement unit) 504 detects the density of the patch 503 formed on the photosensitive member 11 using the PWM pattern. A signal (density signal) detected by the reflective optical sensor 504 is sent to a patch density comparator 505. The patch density comparator 505 compares the density signal detected by the reflective optical sensor 504 and ideal density values as shown in FIG. 9B. If the density value of the optical density detected is equal to any of the ideal density values, then the patch density comparator 505 outputs an equal signal 510 to the PWM patch storage unit 501. It should be noted that if the difference with respect to the ideal density value is less than a prescribed amount (e.g., less than 2%), then this is considered equality and the equal signal 510 is output.

A controller 511 controls processing for modifying the PWM pattern. The controller 511 includes a CPU 520, a ROM 521 for storing data and the program that is executed by the CPU 520, and a RAM 522 for storing various data temporarily when control processing is executed by the CPU 520.

It should be noted that the patch forming unit 502 outputs each of PWM patterns of tones "1" to "15" (PWM pattern 0 to PWM pattern 15) of the kind shown in FIG. 6 and forms the patch 503 on the photosensitive member 11. The optical density of the patch 503 is detected by the reflective optical sensor 504 and the detected optical density is stored in the patch density comparator 505 with reference to the tone N (N=0 through 15) of pattern (PWM pattern N). In the description that follows, it is assumed that the relationship between the tone (PWM pattern N) of PWM pattern at the time the patch 503 is optically read and a optical density value is of the kind shown in FIG. 8B, by way of example. An example of the ideal density values corresponding to the tone of the PWM patterns is shown in FIG. 9B.

In a case where the result of the comparison by the patch density comparator 505 indicates that the density values are not equal, then the a PWM pattern modification unit 506 modifies the currently prevailing PWM pattern. When a new PWM pattern is thus obtained, the new PWM pattern is sent from the PWM pattern modification unit 506 to the PWM patch storage unit 501 and the currently prevailing PWM pattern is replaced with the new PWM pattern in the PWM pattern storage unit 500. This new PWM pattern is then sent to the patch forming unit 502 and is formed on the photosensitive member 11 thereby. The patch is then read by the reflective optical sensor 504 and the patch density comparator 505 compares it with the ideal density values illustrated in FIG. 9B. This processing will be described in detail later with reference to FIGS. 10 and 11.

Figures 8A, 8B:
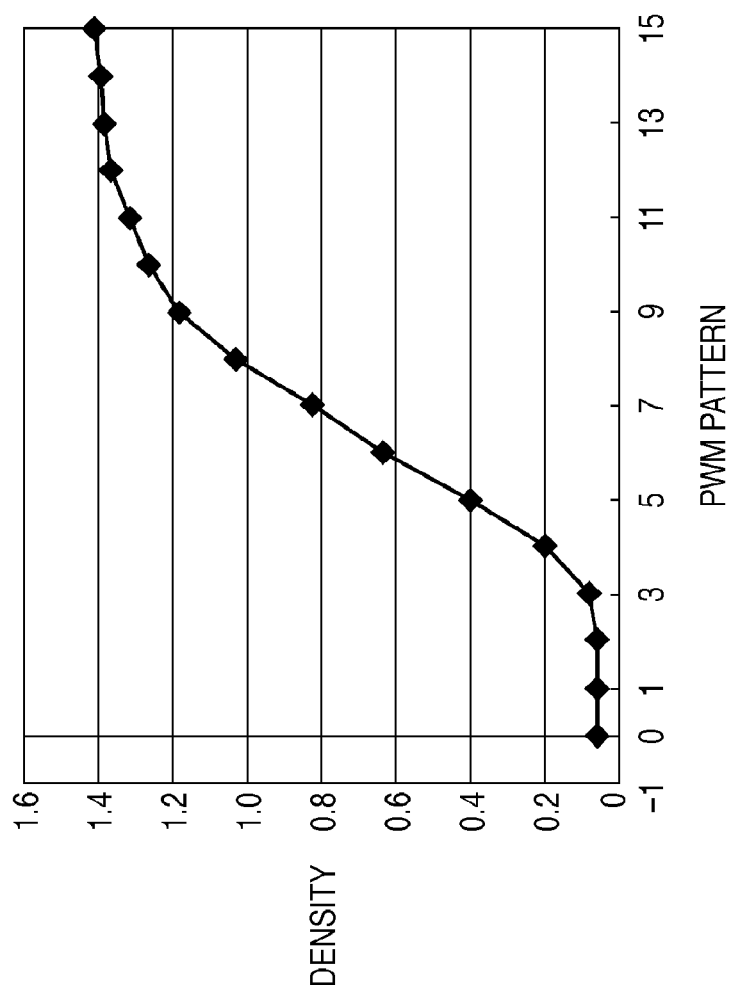
FIGS. 8A and 8B are diagrams illustrating an example of the relationship between optical densities detected by a reflective optical sensor and densities of actual PWM patterns.

FIGS. 8A and 8B are diagrams illustrating an example of the relationship between optically sensed densities detected by the reflective optical sensor 504 and the tone of the PWM patterns. FIG. 8A illustrates this relationship in the form of a graph, and FIG. 8B illustrates detected densities and the tone of the PWM patterns. In FIG. 8A, an abscissa axis indicates the tone (PWM pattern) of the patterns and a vertical axis indicates a detected optical density of each pattern.

In the case of FIGS. 8A and 8B, it will be appreciated that a linear relationship is not maintained and that tonality is fairly poor.

By contrast, FIGS. 9A and 9B are diagrams illustrating an ideal relationship between optical densities detected by the reflective optical sensor 504 and the tone of the PWM patterns. FIG. 9A illustrates this relationship in the form of a graph, and FIG. 9B illustrates detected densities and the tone of the PWM patterns. In FIG. 9A, an abscissa axis indicates the tone (PWM pattern N) of the patterns and a vertical axis indicates a detected optical density of each pattern.

In this embodiment, a case will be described in which a correction is carried out in such a manner that the tone characteristic of FIGS. 8A, 8B possessed by the image forming apparatus is made to approach the ideal characteristic illustrated in FIGS. 9A, 9B. It should be noted that the relationship between the densities of the PWM patterns and the corresponding ideal density values, as shown in FIG. 9B, may be stored in the ROM 521 or may be stored in the PWM pattern storage unit 500.

Figure 10B:
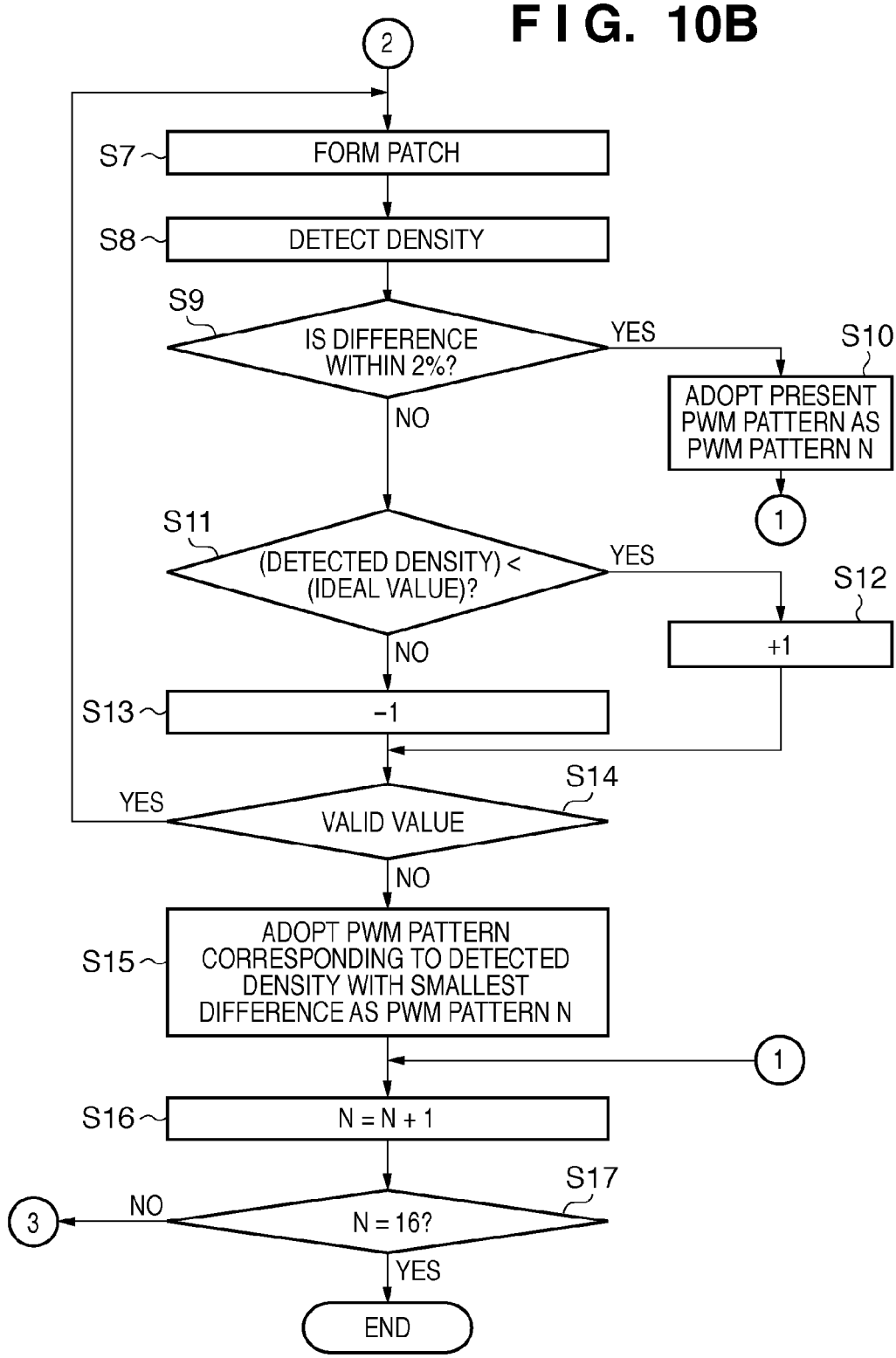

FIGS. 10A and 10B are flowcharts for describing processing for updating a PWM pattern in the image forming apparatus according to this embodiment. Processing for deciding the PWM patterns corresponding to the tones 1 to 15 illustrated in FIG. 6 will be described. This processing is executed by the CPU 520 of the controller 511, and the program for executing this processing has been stored in the ROM 521.

First, in step S1, N is adopted as the PWM pattern to be found and the variable N is set to "1". Next, in step S2, the ideal density value corresponding to the PWM pattern N is acquired. This ideal value is "0.169" as indicated in FIG. 9B and it is assumed that it has been stored in, for example, the ROM 521. It is assumed that the optical densities (see FIG. 8B) obtained by outputting the PWM patterns of the tones "1" to "15" and reading the patch have been stored in, for example, the RAM 522.

Next, in step S3, it is determined whether the detected density values (e.g., the optical density values shown in FIG. 8B) that have been stored in the RAM 522 contain a detected density that matches the ideal density value "0.169" read in step S2 or for which the difference falls within 2%. If such a detected density value exists, then control proceeds to step S4. Here the PWM pattern corresponding to the optical density that matches or exhibits the difference of less than 2% is adopted as the PWM pattern N. The PWM pattern thus adopted is stored in the PWM pattern storage unit 500 as the PWM pattern corresponding to the PWM pattern N (tone N).

If it is determined in step S2 that there is no detected density that matches or exhibits the difference of less than 2%, then control proceeds to step S5. Here a detected density that satisfies the relation (detected density value)<(ideal density value) and that exhibits the smallest difference is found. For instance, in the example of FIGS. 8B and 9B, the ideal density value that corresponds to PWM pattern 1 is "0.169". A detected density value matching this value or exhibiting an error of within 2% does not exist. In step S5, therefore, the detected density value "0.079" corresponding to PWM pattern 3 is obtained as a value smaller than "0.169" and closest to "0.169".

Next, in step S6, a PWM pattern in which one dot has been added onto the left end of the PWM pattern found in step S5 is created. Next, in step S7, a patch is formed on the photosensitive member 11 using the PWM pattern created in step S6. Next, in step S8, the optical density of the formed patch is detected by the reflective optical sensor 504. Then, in step S9, it is determined whether the optical density of the patch read in step S8 and the ideal density value obtained in step S2 is within 2%. If the difference is within 2%, then the control proceeds to step S10, where the PWM pattern created in step S6 is adopted as the PWM pattern corresponding to the PWM pattern N (here N=1 holds). The PWM pattern thus adopted is stored in the PWM pattern storage unit 500 as the PWM pattern corresponding to the PWM pattern N. Control then proceeds to step S16.

On the other hand, if it is determined in step S9 that the difference is not within 2% (i.e., if the difference is equal to or greater than a prescribed amount), then the control proceeds to step S11, where it is determined whether the ideal density value is greater than the detected density detected in step S8. If the ideal density value is greater, then control proceeds to step S12. Here, in a manner similar to that in step S6, one dot is added onto the left end of the PWM pattern used in patch formation in step S7 (i.e., the density pattern is modified). Control then proceeds to step S14.

If the detected density value detected in step S8 is greater than the ideal density value, on the other hand, then control proceeds to step S13. Here one dot at the left end of the PWM pattern used in patch formation in step S7 is shifted leftward by one dot and the original dot at the left end is changed to white (i.e., the density pattern is modified). Control then proceeds to step S14. Here it is determined whether this dot manipulation has been performed within the range of, for example, 1×16 dots shown in FIG. 2, that is, whether the dot manipulation is valid or not. If it is valid, then control proceeds to step S7, a patch is formed using the PWM pattern modified in step S12 or S13, this optical density is detected in step S8 and control proceeds to step S9.

On the other hand, if it is determined to step S14 that the dot manipulation exceeds the valid range, then control proceeds to step S15. Here a detected density closest to the ideal density value is found among the detected densities thus far and the PWM pattern corresponding to this detected density is adopted as the PWM pattern N. The PWM pattern thus adopted is stored in the PWM pattern storage unit 500 as the PWM pattern corresponding to the PWM pattern N. Control then proceeds to step S16. The processing of steps S5, S6 and S9 to S15 described above is executed by the PWM pattern modification unit 506.

The variable N is incremented modified S16. Next, in step S17, it is determined whether variable N="16" holds, that is, whether processing for obtaining PWM patterns up to tone 15 is finished. If processing for obtaining PWM patterns up to tone 15 is not finished, then control proceeds to step S2. Now processing is executed for finding the PWM pattern corresponding to the PWM pattern N.

Figure 11:
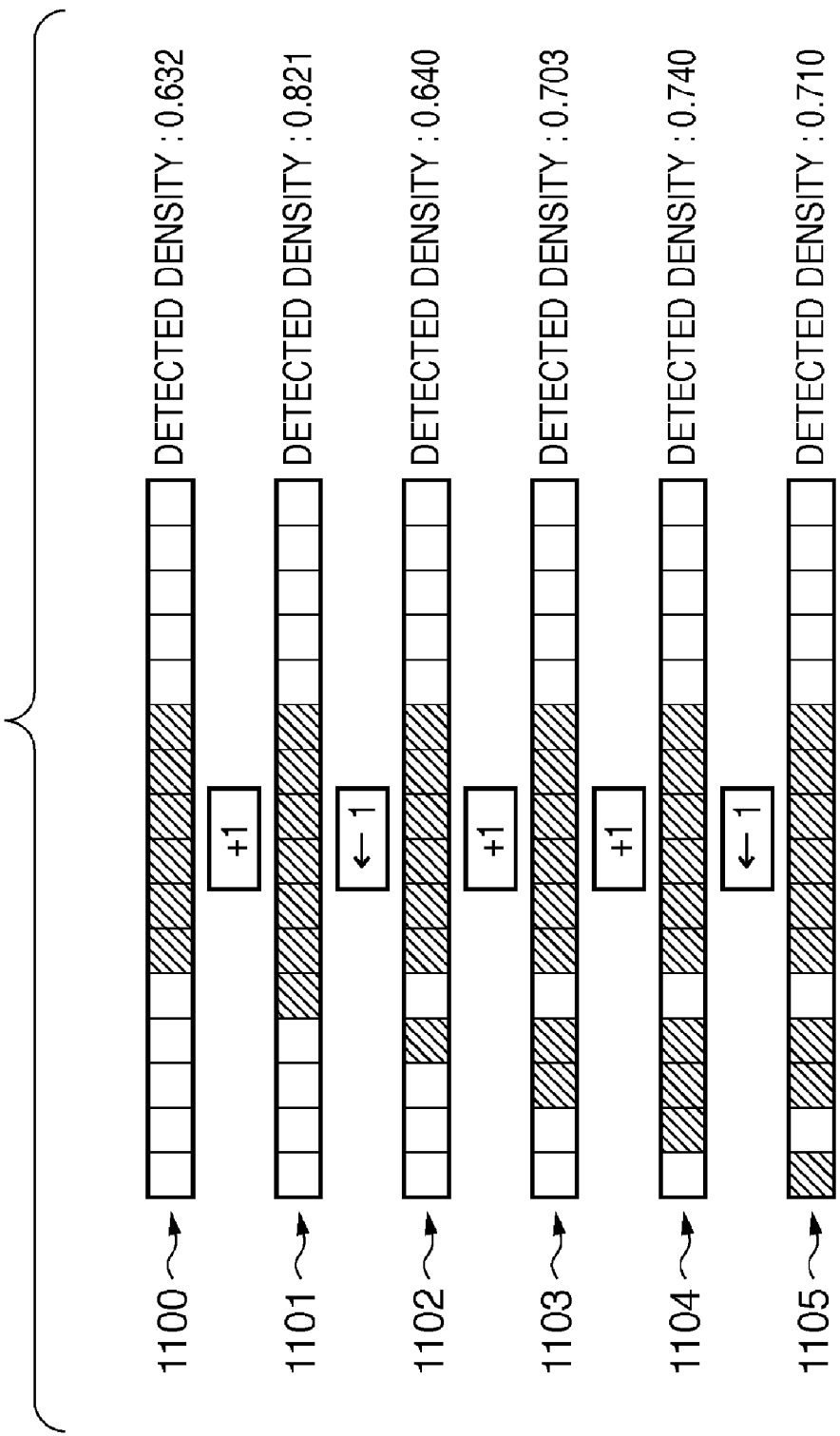
FIG. 11 is a diagram useful in describing a specific example of how a PWM pattern is corrected according to this embodiment.

FIG. 11 is a diagram useful in describing a specific example of how a PWM pattern is corrected according to this embodiment. It should be noted that since there are individual differences among apparatuses with regard to detected density, the tendency shown here may not necessarily appear in all apparatuses. Illustrated here is a specific example of processing for finding a PWM pattern closest to the PWM pattern N (N=8). This will be described with reference to FIGS. 10 and 11.

For example, in FIG. 9B, the ideal density value corresponding to the PWM pattern 8 is "0.719". Density values that fall within the 2% error range of this ideal density value "0.719" are "0.705" to "0.733". It will be understood that a detected density value that falls within this 2% error range does not exist in FIG. 8B. Accordingly, the PWM pattern of the smallest density difference satisfying this magnitude relationship between "detected density value" and "ideal density value" is selected from among the 16 patterns. In the example shown in FIG. 8B, the detected density value of the smallest density difference satisfying the relation "(detected density value)<(ideal density value)" is "0.632" (1100 in FIG. 11) corresponding to PWM pattern 6 in FIG. 8B.

In this case, the error between the detected density value "0.632" and the ideal value "0.719" in FIG. 9B is equal to or greater than 2%. In step S6, therefore, a PWM pattern 1101 in which one dot has been added onto the left end of the PWM pattern 6 is created, as illustrated in FIG. 11. A patch is formed in step S7 based upon this PWM pattern 1101 (FIG. 11) and the optical density of this patch is detected (in step S8). Assume that the detected optical density is "0.821" as shown in FIG. 11. In this case also the error is found to be equal to or greater than 2% in step S9 and therefore the control proceeds to step S11. Now it is found in step S11 that "0.821" (detected density)>"0.719" (ideal density value) holds and therefore the control proceeds to step S13, where a PWM pattern 1102 (FIG. 11) in which the dot at the left end of the PWM pattern 1101 has been moved one dot to the left is created. A patch is formed based upon this PWM pattern 1102 (in step S7) and the optical density of this patch is detected (in step S8). Assume that the detected density is "0.640" as shown in FIG. 11. In this case, the error between the detected density value "0.640" and ideal value "0.719" in FIG. 9 is equal to or greater than 2%. In step S6, therefore, a PWM pattern 1103 in which one dot has been added onto the left end of the PWM pattern 1102 is created, as illustrated in FIG. 11.

A patch is formed again based upon this PWM pattern 1103 (in step S7) and the optical density of this patch is detected (in step S8). Here the detected optical density is "0.703" as shown in FIG. 11. In this case, the error between the detected density value "0.703" and the ideal value "0.719" of FIG. 9 is equal to or greater than 2%. In step S6, therefore, a PWM pattern 1104 in which one dot has been added onto the left end of the PWM pattern 1103 is created, as illustrated in FIG. 11.

A patch is formed based upon this PWM pattern 1104 (in step S7) and the optical density of this patch is detected (in step S8). Here the detected optical density is "0.740". Since "0.740" (detected density)>"0.719" (ideal density value) holds, the control proceeds to step S13, where a PWM pattern 1105 in which the dot at the left end of the PWM pattern 1104 has been moved one dot to the left is created. A patch is formed based upon this PWM pattern 1105 (in step S7) and the optical density of this patch is detected (in step S8). Here the detected density is "0.710" as shown in FIG. 11. In this case the error between the detected density "0.710" and the above-mentioned ideal density value "0.719" is less than 2%. Accordingly, the control proceeds to step S10 and the finally created PWM pattern 1105 is stored in the PWM pattern storage unit 500 as the PWM pattern corresponding to the PWM pattern N (=8).

Thus, in the event that detected density does not fall within 2% of the ideal density value even if correction is executed from PWM pattern 0 onward, a PWM pattern having a detected density value from among the density values thus far that is closest to the ideal density is employed.

The foregoing processing is applied to all PWM patterns N (N=1 to 15), whereby PWM patterns having excellent tonality are created. As a result, when a multi-level image is formed, a PWM pattern corresponding to the pixel density of this multi-level image data is selected and a pixel having a density corresponding to this pixel density is formed. This makes it possible to form an image in which the tone of multi-level image data is reproduced more accurately.

In this embodiment, a patch is formed for every single PWM pattern, the density of the patch is detected and compared and the pattern is changed every time. However, the present invention is not limited to this arrangement, for it is permissible to set a plurality of PWM patterns, form a plurality of patches and execute correction of PWM patterns in parallel.

Further, in this embodiment, the initial pattern is always relied upon when electric power is turned on. However, a PWM pattern that has been corrected may be stored beforehand in a back-up RAM or the like, and this PWM pattern may be read out when electric power is turned on and may be adopted as the PWM pattern used in ordinary printing.

Further, in this embodiment, the density of toner image on the photosensitive member 11 is detected and the PWM pattern is corrected. However, in order to correct for the transfer or fixing characteristic, the density of a patch that has been transferred to a sheet may be detected and the PWM pattern may be corrected based upon the detected density.

Further, although a PWM pattern is determined ahead of ordinary image formation in this embodiment, the foregoing processing may be executed between jobs or in the time between sheets. In such case it would be possible to follow up very small changes in a successively changing environment.

Other Embodiments

The present invention can also be attained by supplying a software program, which implements the functions of the foregoing embodiment, directly or remotely to a system or apparatus, reading the supplied program with a computer of the system or apparatus, and then executing the program. In this case, so long as the system or apparatus has the functions of the program, the mode of implementation need not necessarily be a program.

Accordingly, since the functional processing of the present invention is implemented by computer, the program codes per se installed in the computer also implement the present invention. In other words, the claims of the present invention also cover a computer program that is for the purpose of implementing the functional processing of the present invention. In this case, so long as the system or apparatus has the functions of the program, the form of the program, for example, object code, a program executed by an interpreter or script data supplied to an operating system, etc., does not matter.

Various recording media can be used for supplying the program. Examples are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and a download can be made from the website to a recording medium such as a hard disk. In this case, what is downloaded may be the computer program per se of the present invention or a compressed file that contains an automatic installation function. Further, implementation is possible by dividing the program codes constituting the program of the present invention into a plurality of files and downloading the files from different websites. In other words, a WWW (World Wide Web) server that downloads, to multiple users, the program files that implement the functional processing of the present invention by computer also is covered by the claims of the present invention.

Further, it is also possible to encrypt and store the program of the present invention on a storage medium such as a CD-ROM and distribute the storage medium to users. In this case, users who meet certain requirements are allowed to download decryption key information from a website via the Internet, and the program decrypted using this key information is installed on a computer in executable form.

Further, implementation of the functions is possible also in a form other than one in which the functions of the foregoing embodiment are implemented by having a computer execute a program that has been read. For example, based upon indications in the program, an operating system or the like running on the computer may perform all or a part of the actual processing so that the functions of the foregoing embodiment can be implemented by this processing.

Furthermore, it may be so arranged that a program that has been read from a recording medium is written to a memory provided on a function expansion board inserted into the computer or provided in a function expansion unit connected to the computer. In this case, a CPU or the like provided on the function expansion board or function expansion unit performs some or all of the actual processing based upon the indications in the program and the functions of the foregoing embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-181442, filed Jul. 10, 2007, which is hereby incorporated by reference herein in its entirety.

What is claimed is:

1. An image forming apparatus for forming a tone image using a density pattern method, comprising:
    an image forming unit configured to form an image by an electrophotographic method;
    a first storage unit configured to store a density pattern corresponding to each tone and an ideal density value of the density pattern in correspondence with each other;
    a density detection unit configured to detect an optical density of an image that has been formed by the image forming unit;
    a second storage unit configured to store optical densities, detected by the density detection unit, of images formed by the image forming unit in accordance with density patterns corresponding to respective tones, in correspondence with the respective tones, and
    a modification unit configured to cause the image forming unit to form an image based on a density pattern corresponding to each tone and modify the density pattern corresponding to the each tone, which has been stored in the first storage unit, based upon the optical density detected by the density detection unit and the ideal density value corresponding to the density pattern;
    wherein if a first ideal density value corresponding to a first tone stored in the first storage unit and any one of the optical densities stored in the second storage unit match or differ by less than a prescribed amount, then the modification unit replaces a first density pattern corresponding to the first tone in the first storage unit with the density pattern corresponding to the one of the optical densities.

2. The apparatus according to claim 1, wherein the density pattern is pattern of 1×N dots.

3. An image forming apparatus for forming a tone image using a density pattern method, comprising:
    an image forming unit configured to form an image by an electrophotographic method;
    a first storage unit configured to store a density pattern corresponding to each tone and an ideal density value of the density pattern in correspondence with each other;
    a density detection unit configured to detect an optical density of an image that has been formed by the image forming unit;
    a second storage unit configured to store optical densities, detected by the density detection unit, of images formed by the image forming unit in accordance with density patterns corresponding to respective tones, in correspondence with the respective tones, and
    a modification unit configured to cause the image forming unit to form an image based on a density pattern corresponding to each tone and modify the density pattern corresponding to the each tone, which has been stored in the first storage unit, based upon the optical density detected by the density detection unit and the ideal density value corresponding to the density pattern;
    wherein the modification unit includes:
    a pattern modification unit configured to, if a first ideal density value corresponding to a first tone stored in the first storage unit and any one of the optical densities stored in the second storage unit differ by greater than a prescribed amount, modify a first density pattern corresponding to an optical density stored in the second storage unit, smaller than the first ideal density value and closest to the first ideal density value; and
    a comparison unit configured to form an image by the image forming unit based upon the first density pattern modified by the pattern modification unit, and compare an optical density, which is obtained by detecting the density of the image by the density detection unit, with the first ideal density value;
    wherein the pattern modification unit and the comparison unit are executed until the difference between the optical density based on the modified first density pattern and the first ideal density value is determined to fall below the prescribed amount by the comparison unit, and the density pattern corresponding to the first ideal density value is replaced with the modified first density pattern.

4. The apparatus according to claim 3, wherein the pattern modification unit modifies the first density pattern by adding one dot onto the first density pattern or shifting one dot of the first density pattern.

5. An image forming apparatus for forming a tone image using a density pattern method, comprising:
    an image forming unit configured to form an image by an electrophotographic method;
    a first storage unit configured to store a density pattern corresponding to each tone and an ideal density value corresponding to the each tone;
    a density detection unit configured to detect an optical density of an image that has been formed by the image forming unit;
    a control unit configured to cause the image forming unit to form the density pattern corresponding to the each tone, stored in the first storage unit, and stores an optical density of the density pattern corresponding to the each tone in a second storage unit, detected by the density detection unit;
    a replace unit configured to replace a first density pattern corresponding to a first tone, which has been stored in the first storage unit, with a density pattern corresponding to a first optical density stored in the second storage unit, in a case that a first ideal density value corresponding to the first tone stored in the first storage unit and the first optical density stored in the second storage unit match or differ by less than a prescribed amount; and a modification unit configured to modify a first density pattern corresponding to a first tone, which has been stored in the first storage unit, using a density pattern corresponding to a first optical density being less than a first ideal density value and closest to the first ideal density value stored in the second storage unit, in a case that the first ideal density value corresponding to the first tone stored in the first storage unit and any one of optical densities stored in the second storage unit differ by the prescribed amount or more than the prescribed amount.

6. The apparatus according to claim 5, wherein the modification unit modifies the first density pattern by adding one dot onto the first density pattern or shifting one dot of the first density pattern.

7. The apparatus according to claim 5, further comprising:

a comparison unit configure to form an image by the image forming unit based upon the first density pattern modified by the modification unit, and comparing an optical density, which is obtained by detecting the density of the image by the density detection unit, with the first ideal density value stored in the first storage unit;

wherein the modification unit and the comparison unit are executed until the difference between the optical density based on the modified first density pattern and the first ideal density value is determined to fall below the prescribed amount by the comparison unit, and the density pattern corresponding to the first ideal density value is replaced with the modified first density pattern.

* * * * *